(12) United States Patent
Bhatia

(10) Patent No.: US 12,210,490 B1
(45) Date of Patent: Jan. 28, 2025

(54) SYSTEM AND METHOD TO FACILITATE ONE OR MORE QUALITY CHECKS ON A PLURALITY OF ATTRIBUTES

(71) Applicant: Brightleaf Solutions, Inc., Brookline, MA (US)

(72) Inventor: Samir Bhatia, Brookline, MA (US)

(73) Assignee: BRIGHTLEAF SOLUTIONS, INC., Brookline, MA (US)

(*) Notice: Subject to any disclaimer, the term of this patent is extended or adjusted under 35 U.S.C. 154(b) by 0 days.

(21) Appl. No.: 18/426,501

(22) Filed: Jan. 30, 2024

(51) Int. Cl.
*G06F 16/00* (2019.01)
*G06F 16/21* (2019.01)

(52) U.S. Cl.
CPC .................................. *G06F 16/21* (2019.01)

(58) Field of Classification Search
CPC ............ G06F 18/2155; G06F 18/2178; G06F 40/103; G06F 16/353; G06F 40/30; G06F 18/24765; G06F 40/10; G06F 3/016; G06F 3/04883; G06F 3/0488; G06F 16/38; G06F 16/86; G06Q 10/10; G06Q 50/18; G06V 30/40; G06N 5/043; G06N 20/10; G06N 3/088; G06N 3/126; G06N 7/01
See application file for complete search history.

(56) References Cited

U.S. PATENT DOCUMENTS

| | | |
|---|---|---|
| 2005/0289182 A1 | 12/2005 | Pandian et al. |
| 2006/0242180 A1 | 10/2006 | Graf et al. |
| 2010/0312725 A1 | 12/2010 | Privault et al. |
| 2019/0057357 A1* | 2/2019 | Guan ............... G06Q 10/06314 |

FOREIGN PATENT DOCUMENTS

WO 2019178403 A1 9/2019

* cited by examiner

*Primary Examiner* — Yicun Wu
(74) *Attorney, Agent, or Firm* — Jason C. Cameron

(57) ABSTRACT

A system to facilitate quality checks on a plurality of attributes is disclosed. The system includes a processing subsystem including a screening module to filter at least one document from documents. The processing subsystem includes a data extraction module to extract attributes from the at least one document. The processing subsystem includes a quality checking module to highlight the attributes extracted in a user interface associated with quality checking levels. The quality checking module is to modify at least one of the attributes associated with a first level based on a first level user response. The quality checking module is to assign at least one tag and at least one colour to each of the attributes. The quality checking module is to display the attributes in the user interface associated with a second level to validate the plurality of attributes based on a second level user response.

19 Claims, 5 Drawing Sheets

SYSTEM AND METHOD TO FACILITATE ONE OR MORE QUALITY CHECKS ON A PLURALITY OF ATTRIBUTES

FIELD OF INVENTION

Embodiments of the present disclosure relate to a field of data processing and more particularly to a system and a method to facilitate one or more quality checks on a plurality of attributes.

BACKGROUND

Contracts are legally binding agreements between two or more parties which outline terms and conditions of a business arrangement. The contracts include sales contracts, employment contracts, lease contracts, and the like. The significance of the contracts lie in providing a clear framework for the two or more parties involved, establishing mutual expectations, and minimizing risk of disputes. Accurate interpretation of the contracts are crucial to avoid conflicts, financial losses, and damage to interpersonal relationships.

Identifying one or more information from the contracts is necessary to interpret the contracts. The one or more information includes an effective date, a commencement date, an expiration date, address of the two or more parties and the like. Currently, identifying one or more information from the contracts involves manual searches within the contracts having a significant number of pages, a process prone to errors and inefficiencies and consuming substantial time, thereby harming the business.

Hence, there is a need for an improved system and method to facilitate one or more quality checks on a plurality of attributes to address the aforementioned issue(s).

OBJECTIVE OF THE INVENTION

An objective of the invention is to facilitate one or more quality checks on a plurality of attributes by defining a plurality of quality checking levels in an integrated database based on one or more user inputs.

BRIEF DESCRIPTION

In accordance with an embodiment of the present disclosure, a system to facilitate one or more quality checks on a plurality of attributes is provided. The system includes a processing subsystem hosted on a server and configured to execute on a network to control bidirectional communications among a plurality of modules. The processing subsystem includes a screening module configured to filter at least one document from one or more documents based on a predefined file extension. The processing subsystem also includes a data extraction module operatively coupled to the screening module. The data extraction module is configured to extract the plurality of attributes from the at least one document based on one or more predefined rules. The processing subsystem also includes a quality checking module operatively coupled to the data extraction module. The quality checking module is configured to highlight the plurality of attributes extracted and the one or more corresponding locations of the plurality of attributes in the at least one document in a user interface associated with a plurality of quality checking levels including a first level and a second level. The plurality of quality checking levels are defined in an integrated database based on one or more user inputs. The quality checking module is also configured to modify at least one of the plurality of attributes associated with the first level based on a first level user response upon comparing the plurality of attributes extracted and the plurality of attributes present in the at least one document by a first level user. The quality checking module is also configured to assign at least one tag to each of the plurality of attributes associated with the first level based on the first level user response. The one more tags includes verified, and doubtful. The quality checking module is also configured to assign at least one color to each of the plurality of attributes associated with the first level based on the at least one tag assigned. The quality checking module is also configured to display the plurality of attributes, the at least one tag assigned, and the at least one color assigned to each of the plurality of attributes in the user interface associated with the second level upon receiving the first level user response. The quality checking module is further configured to validate the plurality of attributes based on a second level user response, thereby facilitating the one or more quality checks on the plurality of attributes.

In accordance with another embodiment of the present disclosure, a method to facilitate one or more quality checks on a plurality of attributes is provided. The method includes filtering, by a screening module, at least one document from one or more documents based on a predefined file extension. The method also includes extracting, by a data extraction module, the plurality of attributes from the at least one document based on one or more predefined rules. The method also includes highlighting, by a quality checking module, the plurality of attributes extracted and the one or more corresponding locations of the plurality of attributes in the at least one document in a user interface associated with a plurality of quality checking levels including a first level and a second level. The plurality of quality checking levels are defined in an integrated database based on one or more user inputs. The method also include modifying, by the quality checking module, at least one of the plurality of attributes associated with the first level based on a first level user response upon comparing the plurality of attributes extracted and the plurality of attributes present in the at least one document by a first level user. The method also includes assigning, by the quality checking module, at least one tag to each of the plurality of attributes associated with the first level based on the first level user response. The one more tags includes verified, and doubtful. The method also includes assigning, by the quality checking module, assign at least one color to each of the plurality of attributes associated with the first level based on the at least one tag assigned. The method also includes displaying, by the quality checking module, the plurality of attributes, the at least one tag assigned, and the at least one color assigned to each of the plurality of attributes in the user interface associated with the second level upon receiving the first level user response. The method further includes validating, by the quality checking module, the plurality of attributes based on a second level user response, thereby facilitating the one or more quality checks on the plurality of attributes.

In accordance with another embodiment of the present disclosure, a non-transitory computer-readable medium storing a computer program that, when executed by a processor, causes the processor to perform a method to facilitate one or more quality checks on a plurality of attributes is provided. The method includes filtering, by a screening module, at least one document from one or more documents based on a predefined file extension. The method also includes extracting, by a data extraction module, the plurality of attributes from the at least one document based on one or more predefined rules. The method also includes highlighting, by a quality checking module, the plurality of attributes extracted and the one or more corresponding locations of the plurality of attributes in the at least one document in a user interface associated with a plurality of quality checking levels including a first level and a second level. The plurality of quality checking levels are defined in an integrated database based on one or more user inputs. The method also include modifying, by the quality checking module, at least one of the plurality of attributes associated with the first level based on a first level user response upon comparing the plurality of attributes extracted and the plurality of attributes present in the at least one document by a first level user. The method also includes assigning, by the quality checking module, at least one tag to each of the plurality of attributes associated with the first level based on the first level user response. The one more tags includes verified, and doubtful. The method also includes assigning, by the quality checking module, assign at least one color to each of the plurality of attributes associated with the first level based on the at least one tag assigned. The method also includes displaying, by the quality checking module, the plurality of attributes, the at least one tag assigned, and the at least one color assigned to each of the plurality of attributes in the user interface associated with the second level upon receiving the first level user response. The method further includes validating, by the quality checking module, the plurality of attributes based on a second level user response, thereby facilitating the one or more quality checks on the plurality of attributes.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
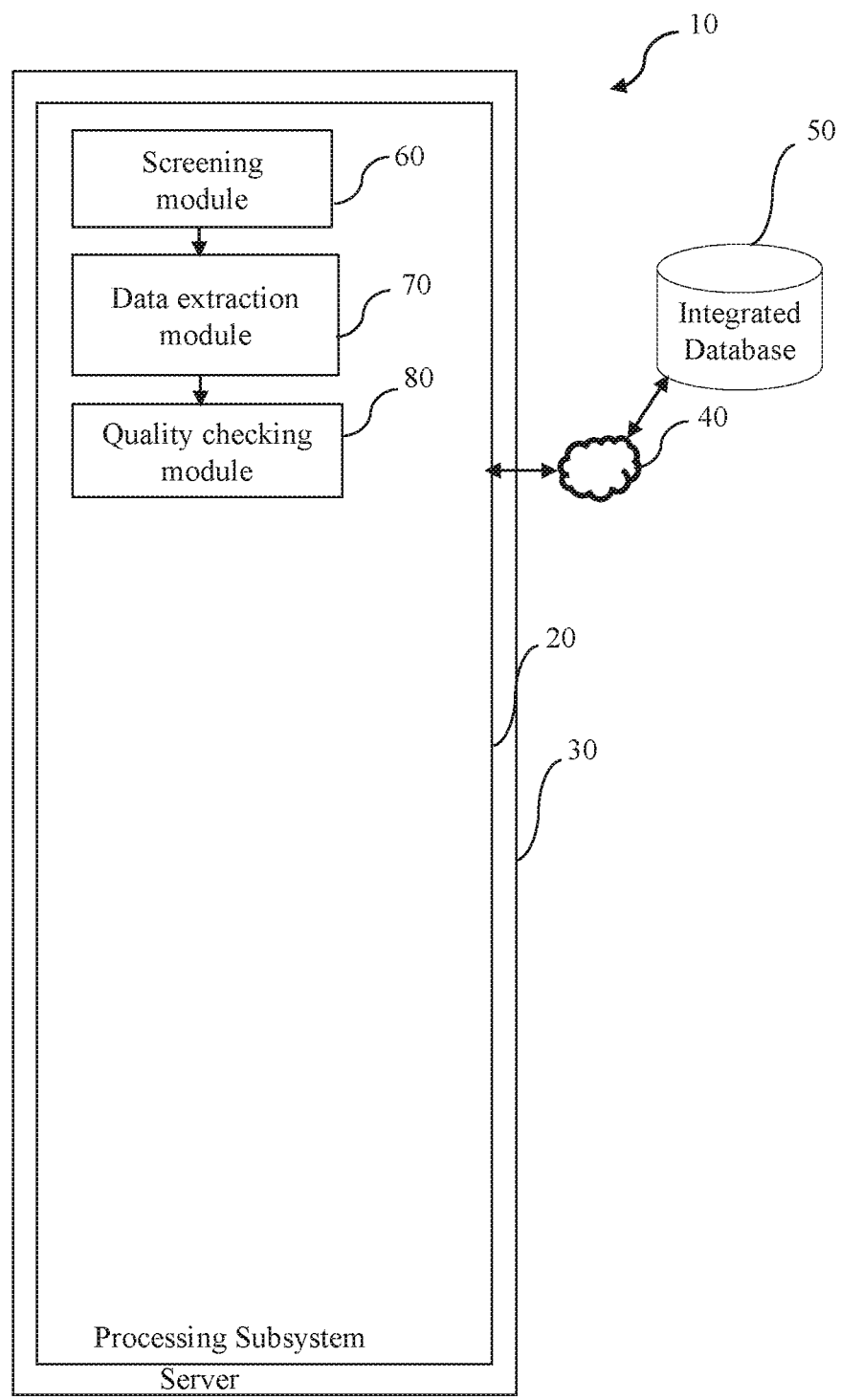
FIG. 1 is a block diagram representation of a system to facilitate one or more quality checks on a plurality of attributes in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

In the discussion that follows, references will be made to "first level", and "second level" with reference to various data storage levels defined in an integrated database for data storage and representational purposes. In the discussion that follows, references will be made to "first level user", and "second level user" with reference to users associated with the first level and the second level respectively.

Embodiments of the present disclosure relate to a system and a method to facilitate one or more quality checks on a plurality of attributes. The system includes a processing subsystem hosted on a server and configured to execute on a network to control bidirectional communications among a plurality of modules. The processing subsystem includes a screening module configured to filter at least one document from one or more documents based on a predefined file extension. The processing subsystem also includes a data extraction module operatively coupled to the screening module. The data extraction module is configured to extract the plurality of attributes from the at least one document based on one or more predefined rules. The processing subsystem also includes a quality checking module operatively coupled to the data extraction module. The quality checking module is configured to highlight the plurality of attributes extracted and the one or more corresponding locations of the plurality of attributes in the at least one document in a user interface associated with a plurality of quality checking levels including a first level and a second level. The plurality of quality checking levels are defined in an integrated database based on one or more user inputs. The quality checking module is also configured to modify at least one of the plurality of attributes associated with the first level based on a first level user response upon comparing the plurality of attributes extracted and the plurality of attributes present in the at least one document by a first level user. The quality checking module is also configured to assign at least one tag to each of the plurality of attributes associated with the first level based on the first level user response. The one more tags includes verified, and doubtful. The quality checking module is also configured to assign at least one color to each of the plurality of attributes associated with the first level based on the at least one tag assigned. The quality checking module is also configured to display the plurality of attributes, the at least one tag assigned, and the at least one color assigned to each of the plurality of attributes in the user interface associated with the second level upon receiving the first level user response. The quality checking module is further configured to validate the plurality of attributes based on a second level user response, thereby facilitating the one or more quality checks on the plurality of attributes.

FIG. 1 is a block diagram representation of a system 10 to facilitate one or more quality checks on a plurality of attributes in accordance with an embodiment of the present disclosure. The system 10 includes a processing subsystem 20 hosted on a server 30 and configured to execute on a network 40 to control bidirectional communications among a plurality of modules. Further, in one embodiment, the server 30 may be a cloud-based server. In another embodiment, the server 30 may be a local server. In one example, the network 40 may be a private or public local area network (LAN) or wide area network (WAN), such as the Internet.

Further, in another embodiment, the network 40 may include both wired and wireless communications according to one or more standards and/or via one or more transport mediums. Furthermore, in one example, the network 40 may include wireless communications according to one of the 802.11 or Bluetooth specification sets, or another standard or proprietary wireless communication protocol. In yet another embodiment, the network 40 may also include communications over a terrestrial cellular network, including, a GSM (global system for mobile communications), CDMA (code division multiple access), and/or EDGE (enhanced data for global evolution) network.

Furthermore, the processing subsystem 20 includes a screening module 60 configured to filter at least one document from one or more documents based on a predefined file extension. As used herein, the file extension may be defined as a suffix attached to a filename, separated by a period, which indicates type of a file. In one embodiment, the predefined file extension may include at least one of a portable document format, and office open extensible markup language. In some embodiments, the one or more documents may include an image file, a text file, a video file, the portable document file and the like. In some embodiments, the screening module 60 may receive the one or more documents from a user.

Additionally, in one embodiment, the screening module 60 may be configured to perform a contextual analysis of the at least one document based on a plurality of parameters to evaluate a relevancy score. In such an embodiment, the plurality of parameters may include an expiry date of the at least one document, commencement date of the at least one document, effective date of the at least one document, one or more conditions present in the at least one document. In one embodiment, the screening module 60 may also be configured to flag the at least one document when the relevancy score is below a predefined threshold. In such an embodiment, the contextual analysis of the at least one document may be performed based on a natural language processing technique. As used herein, the natural language processing technique is a field of artificial intelligence (AI) which focuses on interactions between computers and humans through natural language.

Moreover, for example, consider a scenario in which a user X and a user Y may be a party to a business contract and the user X may be seeking a way to extract the plurality of attributes from the business contract. The business contract may be in the form of a portable document format file. The user X may provide the portable document format file to the screening module 60. The user X may also provide another image file to the screening module 60 by mistake. The screening module 60 may filter the portable document format file excluding the image file based on a predefined setting.

Also, the processing subsystem 20 also includes a data extraction module 70 operatively coupled to the screening module 60. The data extraction module 70 is configured to extract the plurality of attributes from the at least one document based on one or more predefined rules. In one embodiment, the plurality of attributes may include a title, a commencement date, an expiration date, an address and an effective date. In some embodiments, the one or more predefined rules may include a location at which the plurality of attributes may be present in the at least one document, an extent of content that needs to be extracted along with the plurality of attributes from the at least one document, and the like. In one embodiment, the one or more predefined rules may include one or more search queries.

Further, in continuation with the ongoing example, consider a scenario in which, the user X may be interested to extract the effective date of the business contract, and the address of the user Y. The one or more predefined rules may be governing the extraction of the effective date and the address of the user Y from the business contract. The data extraction module 70 may extract the effective date and the address of the user Y from the business contract based on the one or more predefined rules.

Furthermore, the processing subsystem 20 also includes a quality checking module 80 operatively coupled to the data extraction module 70. The quality checking module 80 is configured to highlight the plurality of attributes extracted and the one or more corresponding locations of the plurality of attributes in the at least one document in a user interface associated with a plurality of quality checking levels including a first level and a second level. In one embodiment, the user interface may be associated with a user device including a computer, a personal digital assistant, a phone, a tab and the like. The plurality of quality checking levels are defined in an integrated database 50 based on one or more user inputs. In one embodiment, the integrated database 50 may include a structured query language database. In some embodiments, the integrated database 50 may include a non-structured query language database. In a specific embodiment, the integrated database 50 may include a columnar database and the like.

Moreover, in continuation with the ongoing example, consider a scenario in which, the user X may like to quality check the effective date and the address of the user Y extracted at the plurality of quality checking levels defined in the integrated database 50. Consider a scenario in which the user X may opt for a two level quality check. The quality checking module 80 may define two levels in the integrated database 50 based on the one or more inputs provided by the user X. In one embodiment, the user may be responsible for deciding number of quality checking levels. The two levels may include first level and the second level.

Additionally, the quality checking module 80 may highlight the effective date and the address of the user Y extracted from the business contract in the user interface associated with the first level for a first level user A to enable the first level user A to quality check the effective date and the address of the user Y extracted. Consider another scenario in which the effective date extracted by the quality checking module 80 may be 30/01/1992. The effective date may be present in the business contract at two different locations. The quality checking module 80 may highlight the location of the effective date at both locations in the business contract when the first level user A interacts with the effective date extracted. Interaction of the first level user A with the effective date in the user interface may include a mouse click, hovering of mouse cursor over the effective date highlighted in the user interface and the like. Similarly the quality checking module 80 may highlight the location of the address of the user Y in the business contract when the first level user A hovers mouse cursor over the address extracted.

Also, the quality checking module 80 is configured to modify at least one of the plurality of attributes associated with the first level based on a first level user response upon comparing the plurality of attributes extracted and the plurality of attributes present in the at least one document by a first level user. In continuation with the ongoing example, the first level user A may view the effective date extracted and the one or more corresponding locations of the effective date in the business contract in the user interface to verify the effective date extracted.

Further, consider a scenario in which the address of the user Y extracted by the quality checking module 80 may be as follows: "123 main st, city Ville, state 12345, USA" and the address of the user Y present in the business contract is as follows "123 main street, city ville, state 12345, USA". The first level user A may figure out that, part of the address "123 main street" present in the business document erroneously extracted as "123 main st" by the data extraction module 70 upon comparing the address extracted by the data extraction module 70 and the address present in the business contract. The quality checking module 80 may modify the erroneously extracted part to "123 main street" based on a response provided by the first level user A.

Furthermore, the quality checking module 80 is also configured to assign at least one tag to each of the plurality of attributes associated with the first level based on the first level user response. The one more tags includes verified, and doubtful. In continuation with the ongoing example, consider a scenario in which the first level user A may feel that the effective date extracted is correct upon comparing the effective date extracted with the effective date present in the business contract. The quality checking module 80 may tag the effective date extracted as verified based on the response provided by the first level user A. At the same time, the first level user A is doubtful whether the modification made on the address of the user Y is correct. The quality checking module 80 may tag the address of the user Y as doubtful based on the response provided by the first level user A.

Moreover, the quality checking module 80 is also configured to assign at least one color to each of the plurality of attributes associated with the first level based on the at least one tag assigned. In continuation with the ongoing example, the quality checking module 80 may assign green color to the effective date and yellow color to the address of the user Y since the effective date is tagged as verified and the address of the user Y is tagged as doubtful.

Additionally, the quality checking module 80 is also configured to display the plurality of attributes, the at least one tag assigned, and the at least one color assigned to each of the plurality of attributes in the user interface associated with the second level upon receiving the first level user response. The first level user response may include a confirmation provided by the first level user. In continuation with the ongoing example, upon receiving the response from the first level user A, the quality checking module 80 may display the effective date, and the address of the use Y extracted along with respective tags and colors in the user interface associated with the second level to enable a second level user B to quality check the same.

Also, the quality checking module 80 is configured to validate the plurality of attributes based on a second level user response, thereby facilitating the one or more quality checks on the plurality of attributes. In continuation with the ongoing example, the second level user B may check the address of the user Y tagged as doubtful by the first level user A to see whether the address modified by the first level user A is correct. Upon verifying the address tagged as doubtful by the second level user B, the quality checking module 80 may validate the address of the user Y.

In one embodiment, the quality checking module 80 may be configured to evaluate accuracy of the data extraction module 70 based on the plurality of attributes extracted and the modifications performed on the plurality of attributes by the quality checking module 80 based on the first level user response. In some embodiments, the quality checking module 80 may also be configured to evaluate accuracy of the first level user based on number of the plurality of attributes tagged as verified by the first level user, and number of modifications done on the same by a second level user.

Figure 2:
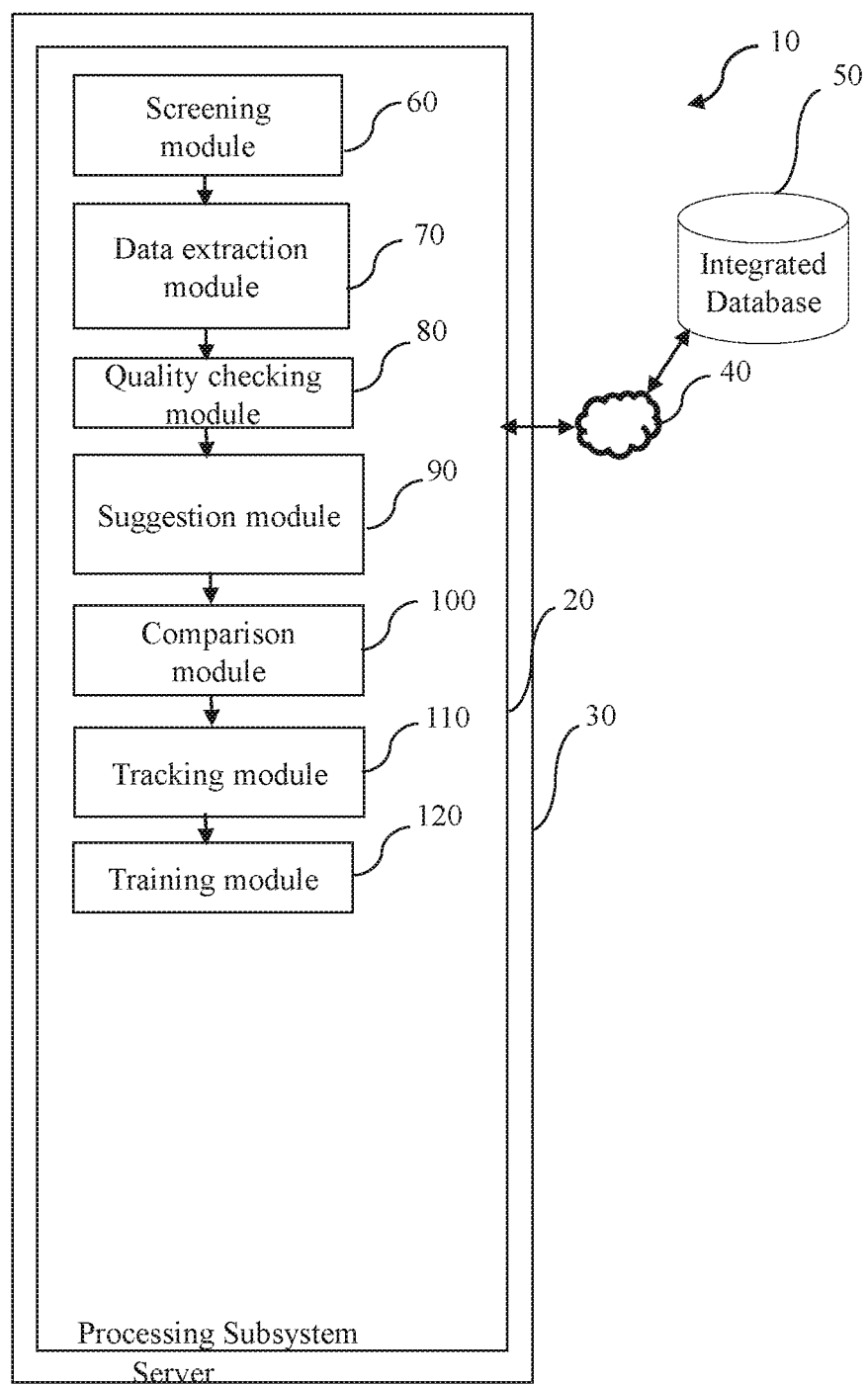
FIG. 2 is a block diagram representation of one embodiment of the system of FIG. 1 in accordance with an embodiment of the present disclosure.

FIG. 2 is a block diagram representation of one embodiment of the system 10 of FIG. 1 in accordance with an embodiment of the present disclosure. The system 10 of FIG. 1 includes the screening module 60, the data extraction module 70 and the quality checking module 80. In one embodiment, the system 10 of FIG. 1 may include the processing subsystem 20 including a suggestion module 90 configured to identify the plurality of attributes from the at least one document based on one or more keywords using a pretrained language model. In such an embodiment, the one or more keywords may be derived from the one or more user defined rules. In such an embodiment, the suggestion module 90 may be configured to populate the plurality of attributes identified in the user interface associated with the first level and the second level to enable the first level user and a second level user to extract at least one attribute from the plurality of attributes in the first level and the second level respectively.

Further, in one embodiment, the pretrained language model may be a machine learning model. In such an embodiment, training of machine learning model may be described as follows. Initially, historical data is collected and processed for a specific attribute. The historical data may be used to create a chunk template and a pattern template. The chunk template may be categorized as positive chunk template and negative chunk template based on presence or absence of the specific attribute.

The pattern template may be created based on variations of the specific attribute. The number of records present in the chunk template may be augmented using unique combinations of records present in the chunk template and the pattern template. Further a training data set may be created in the form of a list including chunk template, class of respective attribute, and an index position of the specific attribute present in the chunk template. The training data set may be used to train the pretrained language model.

Furthermore, in continuation with the ongoing example, consider a scenario in which the data extraction module 70 failed to extract the address of the user Y from the business contract based on the one or more predefined rules. The suggestion module 90 may derive the one or more keywords from the one or more predefined rules. The one or more keywords derived may include address, domicile, location, street and the like. The suggestion module 90 may further identify the address of the user Y from the business contract based on the one or more keywords using the pretrained language model. Consider another scenario in which the business contract may include two addresses associated with the user Y. The two addresses may include a residential address and a business address. The suggestion module 90 may extract the two addresses and populate the same in the user interface associated with the first level as well as the second level to enable the first level user A and the second level user B to extract the required address at respective levels.

Moreover, in one embodiment, the processing subsystem 20 may include a comparison module 100 configured to compare the plurality of attributes highlighted in the user interface of the first level with the plurality of attributes displayed in the user interface of the second level. In such an embodiment, the comparison module 100 may be configured to assign same color to the plurality of attributes highlighted in the user interface of the first level and the plurality of attributes displayed in the user interface of the second level when the plurality of attributes highlighted in the user interface of the first level and the plurality of attributes displayed in the user interface of the second level are same upon comparing. In one embodiment, the comparison module 100 may also be configured to assign different color to the plurality of attributes highlighted in the user interface of the first level and the plurality of attributes displayed in the user interface of the second level when the plurality of attributes highlighted in the user interface of the first level and the plurality of attributes displayed in the user interface of the second level are different upon comparing.

Additionally, in continuation with the ongoing example, the comparison module 100 may compare the effective date highlighted in the user interface of the first level with the effective date displayed in the user interface of the second level. The comparison module 100 may provide same color to the effective date highlighted in the user interface of the first level with the effective date displayed in the user interface of the second level since the effective date highlighted in the user interface of the first level and the effective date displayed in the user interface of the second level are same. Similarly, the comparison module 100 may compare the address of the user Y highlighted in the user interface of the first level with the address of the user Y displayed in the user interface of the second level. The comparison module 100 may provide same color to the address of the user Y highlighted in the user interface of the first level and the address of the user Y displayed in the user interface of the second level since the address of the user Y highlighted in the user interface of the first level with the address of the user Y displayed in the user interface of the second level are same Also, in one embodiment, the processing subsystem 20 may include a tracking module 110 configured to track one or more modifications performed on the at least one of the plurality of attributes, the at least one tag assigned to each of the plurality of attributes in each of the first level and the second level. In continuation with the ongoing example, consider the scenario in which the quality checking module 80 modifies the erroneously extracted part to "123 main street" based on the response provided by the first level user A and the quality checking module may further tag the address of the user Y as doubtful based on the response provided by the first level user A. The tracking module 110 may track the one or more modifications on the address of the user Y and the tag assigned to the address of the user Y at the first level, so that the same can be viewed by the second level user B through the user interface associated with the second level.

Further, in some embodiments, the processing subsystem 20 may include a training module 120 configured to train the pretrained language model based on one or more patterns provided by the user. In one embodiment, the one or more patterns may include the plurality of attributes. In continuation with the ongoing example, consider a scenario in which the data extraction module 70 and the suggestion module 90 may fail to identify the plurality of attributes from the at least one document. In such a scenario, the training module 120 may be configured to train the pretrained language model with the plurality of attributes provided by the user. In one embodiment, the pretrained language model may be a machine learning based model.

Figure 3:
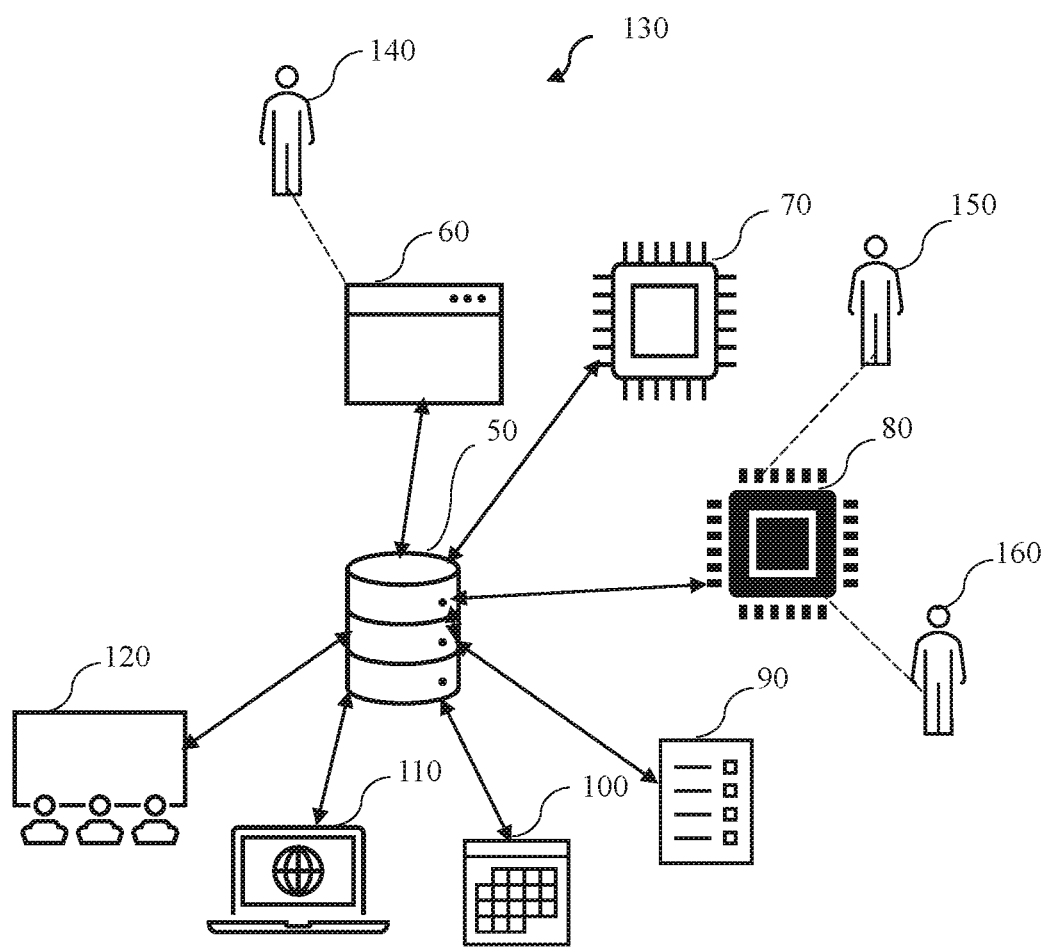
FIG. 3 is a schematic representation of an exemplary embodiment of the system of FIG. 1, in accordance with an embodiment of the present disclosure.

FIG. 3 is a schematic representation of an exemplary embodiment 130 of the system 10 of FIG. 1 in accordance with an embodiment of the present disclosure. Consider a scenario in which a user C 140 and a user D (not shown in FIG. 3) may be a party to a lease agreement and the user C 140 may be seeking a way to extract the plurality of attributes from the lease agreement. The lease agreement may be in the form of a portable document format file. The user C 140 may provide the portable document format file to the screening module 60. The user C 140 may also provide another image file to the screening module 60 by mistake. The screening module 60 may filter the portable document file excluding the image file based on the predefined setting.

Further, the user C 140 may be interested to extract the expiry date of the lease agreement, and the address of the user D. The one or more predefined rules may include, extract the expiry date and the address of the user D from the lease agreement. The data extraction module 70 may extract the expiry date and the address of the user D from the lease agreement based on the one or more predefined rules. The user C 140 may like to quality check the expiry date and the address of the user D extracted at the plurality of quality checking levels upon extraction. For that, the user C 140 may opt for a two level quality check. The quality checking module 80 may define two levels in the integrated database 50 based on the one or more inputs provided by the user C 140.

Furthermore, the two levels may include the first level and the second level. The quality checking module 80 may highlight the expiry date and the address of the user D extracted from the lease agreement in the user interface associated with the first level to enable a first level user E 150 to quality check the expiry date and the address of the user D extracted. Consider a scenario in which the expiry date extracted by the quality checking module 80 may be 20/11/2023 and the expiry date is present in the lease agreement at two different locations. The quality checking module 80 may highlight the location of the expiry date at both locations in the lease agreement when the first level user E 150 interacts with the expiry date extracted. Similarly the quality checking module 80 may highlight the location of the address of the user D in the lease agreement when the first level user E 150 interacts with the expiry date extracted.

Moreover, the first level user E 150 may view the expiry date extracted and the one or more corresponding locations of the expiry date in the lease agreement through the user interface to verify the expiry date extracted. Consider a scenario in which the address of the user D extracted by the quality checking module 80 may be as follows: "Whispering Pines Retreat, maple lane, UK" and the address of the user D present in the lease agreement is as follows "Whispering Pines Retreat LLC, maple lane, UK". The first level user E 150 may figure out that, part of the address "Whispering Pines Retreat LLC" present in the lease agreement erroneously extracted as "Whispering Pines Retreat" by the data extraction module 70 upon comparing the address extracted by the data extraction module 70 and the address present in the lease agreement. The quality checking module 80 may modify the erroneously extracted part to "Whispering Pines Retreat LLC" based on the response provided by the first level user E 150.

Additionally, consider another scenario in which the first level user E 150 may feel that the expiry date extracted is correct upon comparing the expiry date extracted with the expiry date present in the lease agreement. The quality checking module 80 may tag the expiry date extracted as verified based on a response provided by the first level user E 150. At the same time, the first level user E 150 is doubtful whether the modification made on the address of the user D is correct. The quality checking module 80 may tag the address of the user D as doubtful based on the response provided by the first level user E 150.

Moreover, the quality checking module 80 may assign green color to the expiry date and yellow color to the address of the user D since the expiry date is tagged as verified and the address of the user D is tagged as doubtful. Upon receiving the response from the first level user E 150, the quality checking module 80 may display the expiry date, and the address of the use Y extracted along with respective tags and colors in the user interface associated with the second level to enable a second level user F 160 to quality check the same.

Additionally, the second level user F 160 may check the address of the user D tagged as doubtful by the first level user E 150 to see whether the address modified by the first level user E 150 is correct. Upon comparing the address of the user D tagged as doubtful with the address present in the lease agreement, the second level user F 160 may feel that "Whispering Pines Retreat" may be more appropriate than the "Whispering Pines Retreat LLC". The quality checking module 80 may modify "Whispering Pines Retreat" to "Whispering Pines Retreat LLC" based on the response provided by the second level user F 160.

Also, consider another scenario in which the data extraction module 70 failed to extract the address of the user D from the lease agreement based on the one or more predefined rules. The suggestion module 90 may derive the one or more keywords from the one or more predefined rules. The one or more keywords derived may include address, domicile, location, street and the like. The suggestion module 90 may further identify the address of the user D from the lease agreement based on the one or more keywords using the pretrained language model. Consider another scenario in which the lease agreement may include two addresses associated with the user D. The two addresses may include the residential address and the business address. The suggestion module 90 may extract the two addresses and populate the same in the user interface associated with the first level as well as the second level to enable the first level user E 150 and the second level user F 160 to extract the required address at respective levels.

Further, the comparison module 100 may compare the expiry date highlighted in the user interface of the first level with the expiry date displayed in the user interface of the second level. The comparison module 100 may provide same color to the expiry date highlighted in the user interface of the first level with the expiry date displayed in the user interface of the second level since the expiry date highlighted in the user interface of the first level and the expiry date displayed in the user interface of the second level is same. Similarly, the comparison module 100 may compare the address of the user D highlighted in the user interface of the first level with the address of the user D displayed in the user interface of the second level. The comparison module 100 may provide different color to the address of the user D highlighted in the user interface of the first level and the address of the user D displayed in the user interface of the second level since the address of the user D highlighted in the user interface of the first level with the address of the user D displayed in the user interface of the second level are different.

Furthermore, consider another scenario in which the quality checking module 80 modifies the erroneously extracted part to "Whispering Pines Retreat LLC" based on the response provided by the first level user E 150 and the quality checking module may further tag the address of the user D as doubtful based on the response provided by the first level user E 150. The tracking module 110 may track the one or more modifications on the address of the user D and the tag assigned to the address of the user D at the first level, so that the same can be viewed by the second level user F 160 through the user interface associated with the second level.

Additionally, consider another scenario in which the data extraction module 70 fails to extract the plurality of attributes based on the one or more predefined rules and the same plurality of attributes are being suggested by the suggestion module 90. In such a scenario, the training module 120 may be configured to train the pretrained language model with the plurality of attributes provided by the user.

Figure 4:
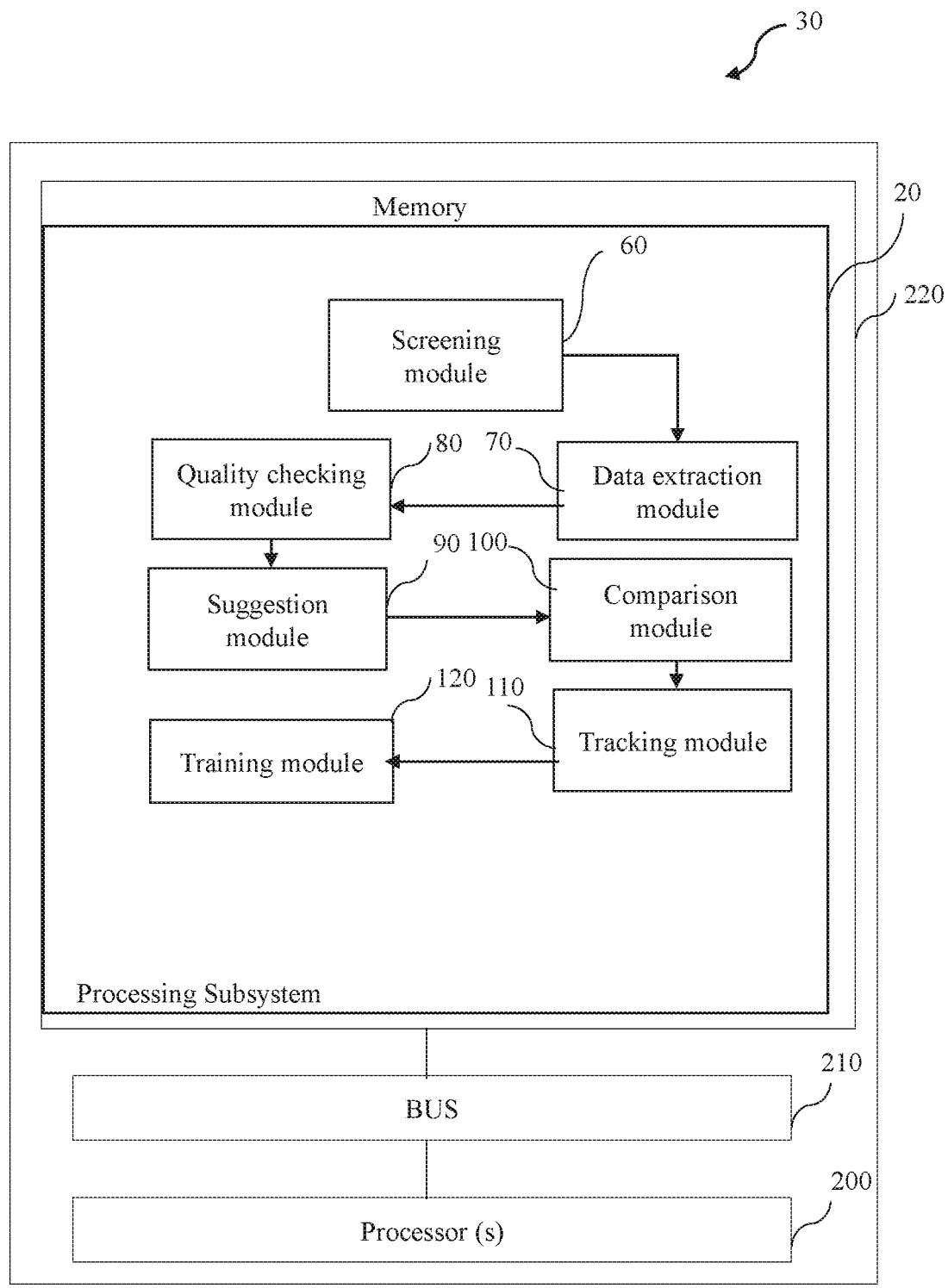
FIG. 4 is a block diagram of a computer or a server in accordance with an embodiment of the present disclosure.

FIG. 4 is a block diagram of a computer or a server 30 in accordance with an embodiment of the present disclosure. The server 30 includes processor(s) 200, and memory 220 operatively coupled to the bus 210. The processor(s) 200, as used herein, includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 220 includes several subsystems stored in the form of executable program which instructs the processor to perform the method steps illustrated in FIG. 1. The memory 220 is substantially similar to the system 10 of FIG. 1. The memory 220 has the following subsystems: the processing subsystem 20 including the screening module 60, the data extraction module 70, the quality checking module 80, the suggestion module 90, the comparison module 100, the tracking module 110 and the training module 120. The plurality of modules of the processing subsystem 20 performs the functions as stated in FIG. 1 and FIG. 2. The bus 210 as used herein refers to be the internal memory channels or computer network that is used to connect computer components and transfer data between them. The bus 210 includes a serial bus or a parallel bus, wherein the serial bus transmit data in bit-serial format and the parallel bus transmit data across multiple wires. The bus 210 as used herein, may include but not limited to, a system bus, an internal bus, an external bus, an expansion bus, a frontside bus, a backside bus, and the like.

The processing subsystem 20 includes a screening module 60 configured to filter at least one document from one or more documents based on a predefined file extension. The processing subsystem 20 also includes a data extraction module 70 operatively coupled to the screening module 60. The data extraction module 70 is configured to extract a plurality of attributes from the at least one document based on one or more predefined rules. The processing subsystem 20 also includes a quality checking module 80 operatively coupled to the data extraction module 70. The quality checking module 80 is configured to highlight the plurality of attributes extracted and the one or more corresponding locations of the plurality of attributes in the at least one document in a user interface associated with a plurality of quality checking levels including a first level and a second level. The plurality of quality checking levels are defined in an integrated database 50 based on one or more user inputs. The quality checking module 80 is also configured to modify at least one of the plurality of attributes associated with the first level based on a first level user response upon comparing the plurality of attributes extracted and the plurality of attributes present in the at least one document by a first level user. The quality checking module 80 is also configured to assign at least one tag to each of the plurality of attributes associated with the first level based on the first level user response. The one more tags includes verified, and doubtful. The quality checking module 80 is also configured to assign at least one color to each of the plurality of attributes associated with the first level based on the at least one tag assigned. The quality checking module 80 is also configured to display the plurality of attributes, the at least one tag assigned, and the at least one color assigned to each of the plurality of attributes in the user interface associated with the second level upon receiving the first level user response. The quality checking module 80 is further configured to validate the plurality of attributes based on a second level user response, thereby facilitating the one or more quality checks on the plurality of attributes.

The processing subsystem 20 includes a suggestion module 90 configured to identify the plurality of attributes from the at least one document based on one or more keywords using a pretrained language model. The one or more keywords are derived from the one or more user defined rules. The suggestion module 90 is also configured to populate the plurality of attributes identified in the user interface associated with the first level and the second level to enable the first level user and a second level user to extract at least one attribute from the plurality of attributes in the first level and the second level respectively.

The processing subsystem 20 also includes a comparison module 100 configured to compare the plurality of attributes present in the first level with the corresponding plurality of attributes present in the second level. The comparison module 100 is also configured to assign same color to the plurality of attributes present in the first level and the corresponding plurality of attributes present in the second level when the plurality of attributes present in the first level and the corresponding plurality of attributes present in the second level are same upon comparing. The comparison module 100 is further configured to assign different color to the plurality of attributes present in the first level and the corresponding plurality of attributes present in the second level when the plurality of attributes present in the first level and the corresponding plurality of attributes present in the second level are different upon comparing.

The processing subsystem 20 also includes a tracking module 110 configured to track one or more modifications performed on the at least one of the plurality of attributes, the at least one tag assigned to each of the plurality of attributes in each of the first level and the second level.

The processing subsystem 20 also includes a training module 120 configured to train a pretrained language model based on one or more patterns provided by the user.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 200.

Figure 5:
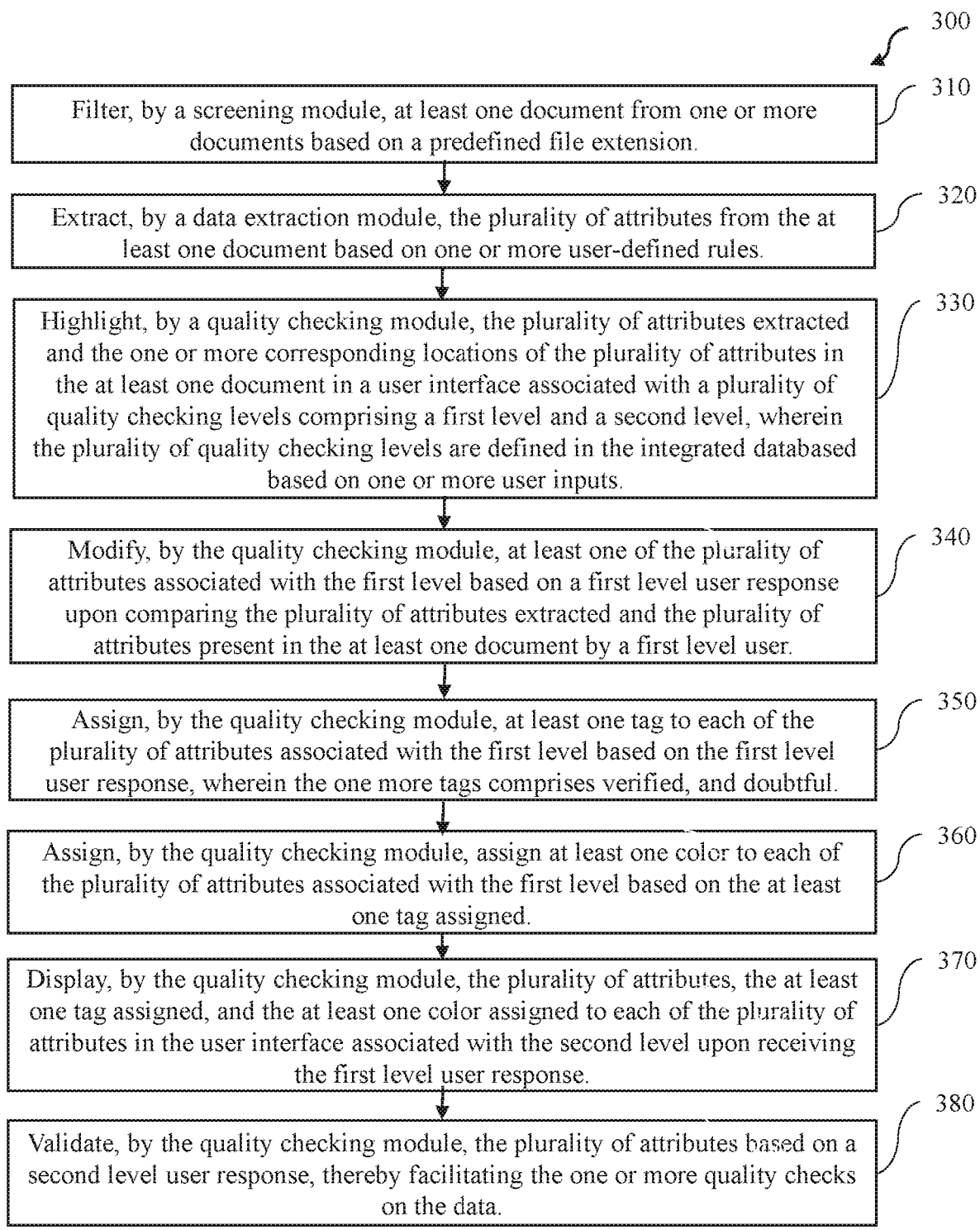
FIG. 5 is a flow chart representing the steps involved in a method to facilitate one or more quality checks on a plurality of attributes in accordance with an embodiment of the present disclosure.

FIG. 5 is a flow chart representing the steps involved in a method 300 to facilitate one or more quality checks on a plurality of attributes in accordance with an embodiment of the present disclosure. The method 300 includes filtering at least one document from one or more documents based on a predefined file extension in step 310. In one embodiment, filtering at least one document from one or more documents based on a predefined file extension includes filtering at least one document from one or more documents based on a predefined file extension includes by a screening module.

In one embodiment, the predefined file extension may include at least one of a portable document format, and office open extensible markup language. In some embodiments, the one or more documents may include an image file, a text file, a video file, a portable document file and the like. In some embodiments, the screening module may receive the one or more documents from a user. In one embodiment, the screening module may be configured to perform a contextual analysis of the at least one document based on a plurality of parameters to evaluate a relevancy score. In such an embodiment, the plurality of parameters may include an expiry date of the at least one document, commencement date of the at least one document, effective date of the at least one document, one or more conditions present in the at least one document. In one embodiment, the screening module may also be configured to flag the at least one document when the relevancy score is below a predefined threshold.

The method 300 also includes extracting the plurality of attributes from the at least one document based on one or more predefined rules in step 320. In one embodiment, extracting the plurality of attributes from the at least one document based on one or more predefined rules includes extracting the plurality of attributes from the at least one document based on one or more predefined rules by a data extraction module. In one embodiment, the plurality of attributes may include a title, a commencement date, an expiration date, an address and an effective date. In some embodiments, the one or more predefined rules may include a location at which the plurality of attributes may present, an extent of content that needs to be extracted along with the plurality of attributes and the like.

The method 300 also includes highlighting the plurality of attributes extracted and the one or more corresponding locations of the plurality of attributes in the at least one document in a user interface associated with a plurality of quality checking levels including a first level and a second level in step 330. In one embodiment, highlighting the plurality of attributes extracted and the one or more corresponding locations of the plurality of attributes in the at least one document in a user interface associated with a plurality of quality checking levels including a first level and a second level includes highlighting the plurality of attributes extracted and the one or more corresponding locations of the plurality of attributes in the at least one document in a user interface associated with a plurality of quality checking levels including a first level and a second level by a quality checking module. The plurality of quality checking levels are defined in an integrated database based on one or more user inputs.

The method 300 also include modifying at least one of the plurality of attributes associated with the first level based on a first level user response upon comparing the plurality of attributes extracted and the plurality of attributes present in the at least one document by a first level user in step 340. In one embodiment, modifying at least one of the plurality of attributes associated with the first level based on a first level user response upon comparing the plurality of attributes extracted and the plurality of attributes present in the at least one document by a first level user includes modifying at least one of the plurality of attributes associated with the first level based on a first level user response upon comparing the plurality of attributes extracted and the plurality of attributes present in the at least one document by a first level user by the quality checking module.

The method 300 also includes assigning at least one tag to each of the plurality of attributes associated with the first level based on the first level user response in step 350. In one embodiment, assigning at least one tag to each of the plurality of attributes associated with the first level based on the first level user response includes assigning at least one tag to each of the plurality of attributes associated with the first level based on the first level user response by the quality checking module. The one more tags includes verified, and doubtful.

The method 300 also includes assigning at least one color to each of the plurality of attributes associated with the first level based on the at least one tag assigned in step 360. In one embodiment, assigning at least one color to each of the plurality of attributes associated with the first level based on the at least one tag assigned includes assigning at least one color to each of the plurality of attributes associated with the first level based on the at least one tag assigned by the quality checking module.

The method 300 also includes displaying the plurality of attributes, the at least one tag assigned, and the at least one color assigned to each of the plurality of attributes in the user interface associated with the second level upon receiving the first level user response in step 370. In one embodiment, displaying the plurality of attributes, the at least one tag assigned, and the at least one color assigned to each of the plurality of attributes in the user interface associated with the second level upon receiving the first level user response includes displaying the plurality of attributes, the at least one tag assigned, and the at least one color assigned to each of the plurality of attributes in the user interface associated with the second level upon receiving the first level user response by the quality checking module.

The method 300 further includes validating the plurality of attributes based on a second level user response, thereby facilitating the one or more quality checks on the plurality of attributes in step 380. In one embodiment, validating the plurality of attributes based on a second level user response, thereby facilitating the one or more quality checks on the plurality of attributes includes validating the plurality of attributes based on a second level user response, thereby facilitating the one or more quality checks on the plurality of attributes by the quality checking module.

In one embodiment, the quality checking module may be configured to evaluate accuracy of the data extraction module based on the plurality of attributes extracted and the modifications performed on the plurality of attributes by the quality checking module based on the first level user response. In some embodiments, the quality checking module may also be configured to evaluate accuracy of the first level user based on number of the plurality of attributes tagged as verified by the first level user, and number of modifications done on the same by a second level user.

Various embodiments of the system and method to facilitate one or more quality checks on the plurality of attributes described above enable various advantages. The screening module is capable of filtering at least one document from the one or more documents based on the predefined file extension, thereby providing a way to filter out irrelevant documents. The data extraction module is capable of extracting the plurality of attributes from the at least one document based on one or more predefined rules, thereby providing a way to hassle free extraction of the plurality of attributes.

Further, the quality checking module is capable of highlighting the plurality of attributes extracted and the one or more corresponding locations of the plurality of attributes in the at least one document in the user interface, thereby enabling the first level user and the second level user to easily compare and modify the plurality of attributes extracted. The quality checking module is also capable of assigning at least one tag to each of the plurality of attributes associated with the first level based on the first level user response, thereby providing a way to easily differentiate the plurality of attributes that are verified, and the plurality of attributes that are doubtful from the perspective of the first level user and the second level user.

Furthermore, the quality checking module is capable of assigning at least one color to each of the plurality of attributes associated with the first level based on the at least one tag assigned, thereby providing a way to easily identify the plurality of attributes and the respective tags. The quality checking module is capable of displaying the plurality of attributes, the at least one tag assigned, and the at least one color assigned to each of the plurality of attributes in the user interface of the second level, enabling the quality check through the second level user, thereby ensuring accurate extraction of the plurality of attributes with in the minimum possible time.

Moreover, the suggestion module is capable of identifying the plurality of attributes from the at least one document based on one or more keywords using the pretrained language model. The suggestion module is capable of populating the plurality of attributes identified in the user interface associated with the first level and the second level to enable the first level user and a second level user to extract at least one attribute from the plurality of attributes in the first level and the second level respectively, thereby achieving superior efficiency during extraction of the plurality of attributes backed by the machine learning model.

Additionally, the comparison module is capable of color coding the plurality of attributes present in the first level and the corresponding plurality of attributes present in the second level based on whether the plurality of attributes present in the first level and the plurality of attributes present in the second level are same or not, thereby providing an easy way to distinguish the plurality of attributes that are same in each level and different in each level.

Also, the tracking module is capable of tracking the one or more modifications performed on the at least one of the plurality of attributes, the at least one tag assigned to each of the plurality of attributes in each of the first level and the second level, thereby enabling the first level user and the second level user to be aware about the history of modifications and take informed decisions. The training module is capable of training the pretrained language model based on the one or more patterns provided by the user, thereby making the system adaptive.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

I claim:

1. A system to facilitate one or more quality checks on a plurality of attributes comprising:
   characterized in that:
   a processing subsystem hosted on a server and configured to execute on a network to control bidirectional communications among a plurality of modules comprising:
   a screening module configured to filter at least one document from one or more documents based on a predefined file extension;
   a data extraction module operatively coupled to the screening module, wherein the data extraction module is configured to extract the plurality of attributes from the at least one document based on one or more predefined rules;
   a quality checking module operatively coupled to the data extraction module, wherein the quality checking module is configured to;
   highlight the plurality of attributes extracted and the one or more corresponding locations of the plurality of attributes in the at least one document in a user interface associated with a plurality of quality checking levels comprising a first level and a second level, wherein the plurality of quality checking levels are defined in an integrated database based on one or more user inputs;
   modify at least one of the plurality of attributes associated with the first level based on a first level user response upon comparing the plurality of attributes extracted and the plurality of attributes present in the at least one document by a first level user;
   assign at least one tag to each of the plurality of attributes associated with the first level based on the first level user response, wherein the one more tags comprises verified, and doubtful;
   assign at least one color to each of the plurality of attributes associated with the first level based on the at least one tag assigned;
   display the plurality of attributes, the at least one tag assigned, and the at least one color assigned to each of the plurality of attributes in the user interface associated with the second level upon receiving the first level user response; and
   validate the plurality of attributes based on a second level user response, thereby facilitating the one or more quality checks on the plurality of attributes.

2. The system of claim 1, wherein the plurality of attributes comprises unstructured data.

3. The system of claim 1, wherein the predefined file extension comprises at least one of a portable document format, and office open extensible markup language.

4. The system of claim 1, wherein the one or more documents comprises an image file, a text file, a portable document file and a video file.

5. The system of claim 1, wherein the plurality of attributes comprises a title, a commencement date, an expiration date, and an effective date.

6. The system of claim 1, wherein the screening module is configured to:
   perform a contextual analysis of the at least one document based on a plurality of parameters to evaluate a relevancy score, wherein the plurality of parameters comprises expiry date of the at least one document, commencement date of the at least one document, effective date of the at least one document, one or more conditions present in the at least one document; and
   flag the at least one document when the relevancy score is below a predefined threshold.

7. The system as claimed in claim 6, wherein the contextual analysis is performed using a natural language processing technique.

8. The system of claim 1, wherein the processing subsystem comprises a suggestion module configured to:
   identify the plurality of attributes from the at least one document based on one or more keywords using a pretrained language model, wherein the one or more keywords are derived from the one or more user defined rules; and
   populate the plurality of attributes identified in the user interface associated with the first level and the second level to enable the first level user and a second level user to extract at least one attribute from the plurality of attributes in the first level and the second level respectively.

9. The system of claim 1, wherein the processing subsystem comprises a comparison module configured to:
   compare the plurality of attributes present in the first level with the corresponding plurality of attributes present in the second level;
   assign same color to the plurality of attributes present in the first level and the attributes present in the second level when the plurality of attributes present in the first level and the plurality of attributes present in the second level are same upon comparing; and assign different color to the plurality of attributes present in the first level and the attributes present in the second level when the plurality of attributes present in the first level and the plurality of attributes present in the second level are different upon comparing.

10. The system of claim 1, wherein the processing subsystem comprises a tracking module configured to track one or more modifications performed on the at least one of the plurality of attributes, the at least one tag assigned to each of the plurality of attributes in each of the first level and the second level.

11. The system of claim 1, wherein the processing subsystem comprises a training module configured to train a pretrained language model based on one or more patterns provided by the user.

12. The system of claim 1, wherein the integrated database comprises a structured query language database.

13. The system of claim 1, wherein the integrated database comprises a non-structured query language database.

14. The system of claim 1, wherein the server comprises a cloud based server.

15. The system of claim 1, wherein the server comprises a local server.

16. The system of claim 1, wherein the network comprises a local area network.

17. The system of claim 1, wherein the network comprises a wide area network.

18. A method to facilitate one or more quality checks on a plurality of attributes comprising:

filtering, by a screening module, at least one document from one or more documents based on a predefined file extension;

extracting, by a data extraction module, the plurality of attributes from the at least one document based on one or more predefined rules;

highlighting, by a quality checking module, the plurality of attributes extracted and the one or more corresponding locations of the plurality of attributes in the at least one document in a user interface associated with a plurality of quality checking levels comprising a first level and a second level, wherein the plurality of quality checking levels are defined in an integrated databased based on one or more user inputs;

modifying, by the quality checking module, at least one of the plurality of attributes associated with the first level based on a first level user response upon comparing the plurality of attributes extracted and the plurality of attributes present in the at least one document by a first level user;

assigning, by the quality checking module, at least one tag to each of the plurality of attributes associated with the first level based on the first level user response, wherein the one more tags comprises verified, and doubtful;

assigning, by the quality checking module, assign at least one color to each of the plurality of attributes associated with the first level based on the at least one tag assigned;

displaying, by the quality checking module, the plurality of attributes, the at least one tag assigned, and the at least one color assigned to each of the plurality of attributes in the user interface associated with the second level upon receiving the first level user response; and validating, by the quality checking module, the plurality of attributes based on a second level user response, thereby facilitating the one or more quality checks on the plurality of attributes.

19. A non-transitory computer-readable medium storing a computer program that, when executed by a processor, causes the processor to perform a method to facilitate one or more quality checks on a plurality of attributes, wherein the method comprises:

filtering, by a screening module, at least one document from one or more documents based on a predefined file extension;

extracting, by a data extraction module, the plurality of attributes from the at least one document based on one or more predefined rules;

highlighting, by a quality checking module, the plurality of attributes extracted and the one or more corresponding locations of the plurality of attributes in the at least one document in a user interface associated with a plurality of quality checking levels comprising a first level and a second level, wherein the plurality of quality checking levels are defined in an integrated databased based on one or more user inputs;

modifying, by the quality checking module, at least one of the plurality of attributes associated with the first level based on a first level user response upon comparing the plurality of attributes extracted and the plurality of attributes present in the at least one document by a first level user;

assigning, by the quality checking module, at least one tag to each of the plurality of attributes associated with the first level based on the first level user response, wherein the one more tags comprises verified, and doubtful;

assigning, by the quality checking module, assign at least one color to each of the plurality of attributes associated with the first level based on the at least one tag assigned;

displaying, by the quality checking module, the plurality of attributes, the at least one tag assigned, and the at least one color assigned to each of the plurality of attributes in the user interface associated with the second level upon receiving the first level user response; and validating, by the quality checking module, the plurality of attributes based on a second level user response, thereby facilitating the one or more quality checks on the plurality of attributes.

\* \* \* \* \*